Figure 1:
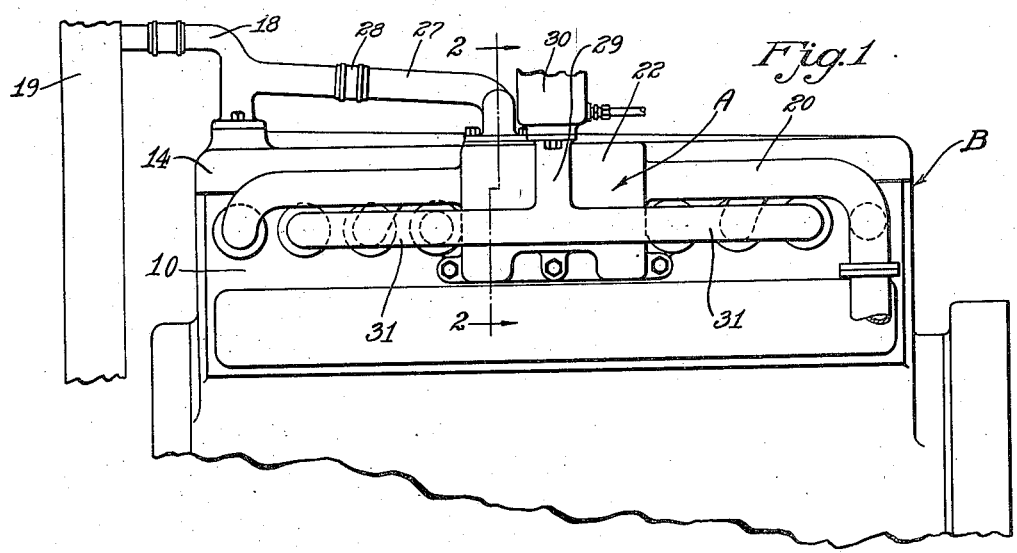

Aug. 4, 1936.  H. H. TIMIAN  2,049,596
ENGINE
Filed Sept. 12, 1932

INVENTOR.
Harold H. Timian
BY
ATTORNEY.

Patented Aug. 4, 1936

2,049,596

UNITED STATES PATENT OFFICE 2,049,596

ENGINE

Harold H. Timian, Detroit, Mich., assignor to Continental Motors Corporation, Detroit, Mich., a corporation of Virginia Application September 12, 1932, Serial No. 632,646

11 Claims. (Cl. 123—52)

My invention relates to engines and more particularly to a manifold structure adapted for assembly with engines of the internal combustion type having exhaust and intake gas manifold portions located on the same side of the engine, and more particularly my invention is especially adapted for a manifold of the downdraft type.

In engines of the aforesaid type, it is customary to provide a compact manifold assembly resulting in a construction in which the intake manifold portion lies substantially close to the exhaust manifold portion, and consequently heat is transferred from the exhaust manifold portion to the intake manifold portion. It is difficult to control the amount of heat transferred between these manifold portions and I have found that in many instances, and especially in connection with a downdraft intake manifold, an excessive amount of heat is transferred, which subjects the carburetor to an excess of heat that will materially decrease the operating efficiency of the engine. Heat which radiates from the exhaust manifold especially in that type of engine employed for motor vehicles is generally radiated upwardly and thus in downdraft systems in which the carburetor is above the exhaust manifold, the carburetor tends to become overheated.

It is an object of my invention to construct an internal combustion engine of the aforesaid type having generally improved operating characteristics by providing an improved manifold structure in which the tendency for a transference of an excessive amount of heat from the exhaust manifold portion to a downdraft carburetor associated with a downdraft intake manifold is substantially eliminated.

Another object of my invention is to provide an improved compact manifold structure for engines of the aforesaid type with particular reference to the transference of heat from one manifold portion to the other by providing a structure which includes heat absorbing means associated with the exhaust manifold portion whereby to minimize the radiation of heat from the exhaust manifold.

A further object of my invention is to provide an improved manifold structure having intake and exhaust gas manifold portions positioned in proximity to each other and further being provided with a water jacket interposed between said manifold portions and adapted for conducting a cooling medium for absorbing the heat from said exhaust manifold portion to thereby minimize the radiation of heat from the exhaust manifold.

A still further object of my invention is to provide an improved manifold structure for internal combustion engines by providing an intermediate water circulating means adapted for conducting a cooling medium such as water between the intake and exhaust manifold portions and arranged for connection with a cooling system of the engine, said water circulating means being arranged to shield a particular portion of the intake manifold from heat radiations for maintaining the carburetor at a predetermined temperature.

Figure 2:
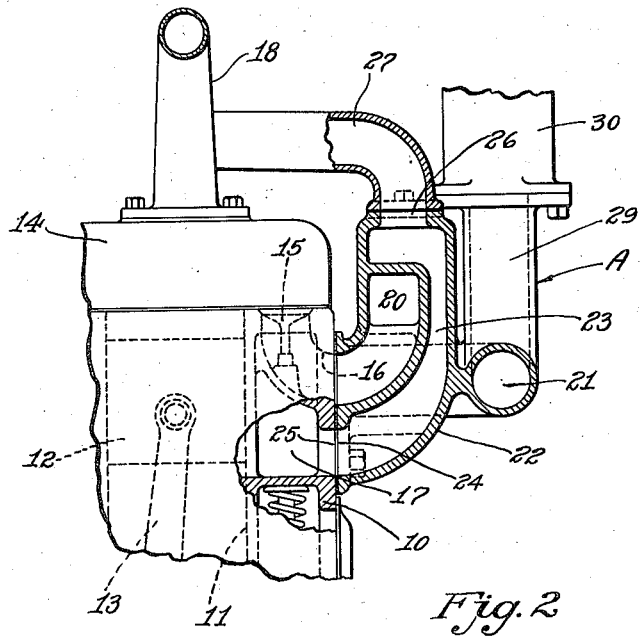

For a more detailed understanding of my invention, reference may be had to the accompanying drawing which ilustrates one form which my invention may assume, and in which:

Fig. 1 is a side elevational view of an engine incorporating a manifold structure constructed in accordance with my invention, and Fig. 2 is a fragmentary sectional view through the manifold structure and showing the engine in an elevation with a portion thereof broken away to illustrate the connection between the engine cooling system and manifold cooling system.

A manifold structure illustrated in the accompanying drawing is adapted for assembly with an internal combustion engine and insofar as the present invention is concerned, it would be obvious that my improved manifold may be assembled with engines of the various types. I have illustrated a manifold structure A as being incorporated with an internal combustion engine B of the poppet valve type merely to illustrate one adaptation of my invention. The engine herein illustrated includes a cylinder block 10 having a plurality of cylinders 11 in which pistons 12 are reciprocated, said pistons being adapted to be connected in the usual manner with an engine crankshaft (not shown) by means of a connecting rod 13. A cylinder head 14 is preferably secured to the block and said block preferably supports suitable valving mechanism for controlling the intake and exhaust of the engine. (Fig. 2 illustrates an exhaust valve 15 which is supported by the cylinder and operated in the usual manner.)

The cylinder block is provided with an exhaust passage 16 and a water jacket 17 that is constructed in the usual manner for cooling the engine. In general with most engines of this type, the cooling medium, such as water, is circulated through the engine jacket 17 and exhausted therefrom through the cylinder head 14 and water conduit 18 to a suitable radiator 19.

The manifold structure A associated with this engine is provided with an exhaust manifold portion 20 and an intake manifold portion 21, said portions being arranged in proximity with each other to provide a compact manifold structure. In many instances the intake and exhaust manifold portions may be formed integral as shown in the accompanying drawing, but it will be obvious that it is not essential to the invention that the same be integrally formed in one piece. I have illustrated my invention in connection with a downdraft intake manifold adapted for connection with a usual type of downdraft carburetor.

The illustrated embodiment of my invention provides a jacket portion 22 associated with the exhaust manifold portion and preferably includes a water conduit 23 extending intermediate the exhaust and intake manifold portions. The inlet 24 of said conduit 23 is adapted for cooperation with an outlet 25 in the cylinder block so as to place the conduit 23 in communication with the cylinder jacket 17. The outlet 26 of said conduit communicates with a pipe or conduit 27 that is adapted to be connected by suitable coupling 28 with the water conduit 18. The intake manifold portion is provided with a primary fuel mixture conducting portion 29 sometimes referred to as a "riser", this primary conducting portion being connected in the usual manner with a downdraft carburetor 30 and serving to connect the carburetor outlet with the intake manifold branches 31 which distribute the intake gases to the various engine cylinders. It is this primary fuel mixture conducting portion which has a tendency to absorb heat from the exhaust manifold portion, this heat being readily transmitted upwardly to the carburetor and tends to excessively expand the fuel mixture therein and thereby decrease the volumetric efficiency of the engine. I find it advisable to locate the water conduit 23 intermediate the exhaust manifold portion and the primary fuel mixture conducting portion of the intake manifold portion. Preferably, in order to take full advantage of the water circulating through the conduit 23, said conduit is preferably arranged to extend substantially transverse of the intake and exhaust manifold portions in proximity to the primary fuel mixture conducting portions and it will be noted that this conduit 23 preferably extends substantially longitudinally of the primary fuel mixture conducting portion 29.

It will thus be noted that the heat of the exhaust gases which tend to radiate outwardly of the walls of the exhaust manifold portion, are thus intercepted by the cooling medium, such as water flowing through the conduit 23 and thereby prevent it from being transferred for the most part to the intake manifold portion. More particularly the location of this jacket at this particular point provides a structure which directly shields the carburetor 30 that is located above the manifold structure and which would otherwise be subjected to an excessive amount of heat which radiates from the exhaust manifold and tends to flow upwardly. Thus the essential factor in the determination of the character and location of the heat absorbing device depends largely upon the location and type of carburetor employed. The riser 29 is a good heat conductor and I obtain the aforesaid objects by shielding the riser from the exhaust manifold as well as the carburetor.

It will be apparent to those skilled in the art to which my invention pertains, that various modifications and changes may be made therein without departing from the spirit of my invention or from the scope of the appended claims.

What I claim as my invention is:

1. A manifold structure for an internal combustion engine having a carburetor and including an exhaust manifold portion and an intake manifold portion provided with an upwardly extending primary conducting portion operatively connected with said carburetor, said carburetor being positioned substantially above said exhaust manifold portion, said manifold portions being located exteriorly of said engine and adjacent one side thereof, said structure further including means exteriorly of said engine for circulating a cooling medium intermediate said exhaust and intake manifold portions whereby to shield the carburetor from the heat of the exhaust manifold.

2. A manifold structure for an internal combustion engine having a carburetor and including an exhaust manifold portion and an intake manifold portion provided with an upwardly extending primary conducting portion operatively connected with the engine carburetor, said carburetor being positioned substantially above said exhaust manifold portion, said manifold portions being located exteriorly of said engine and adjacent one side thereof, said structure further including a conduit exteriorly of said engine for circulating a cooling medium intermediate said exhaust and intake manifold portions whereby to shield the carburetor from the heat of the exhaust manifold.

3. A manifold structure for an internal combustion engine having a carburetor and including an exhaust manifold portion and an intake manifold portion provided with an upwardly extending primary conducting portion operatively connected with the engine carburetor, said carburetor positioned substantially above said exhaust manifold portion, said manifold portions being located exteriorly of said engine and adjacent one side thereof, said structure further including a water jacket disposed intermediate said exhaust and intake manifold portions whereby to shield the carburetor from the heat of the exhaust manifold.

4. A manifold structure for an internal combustion engine and including an exhaust manifold portion and an intake manifold portion, said portions extending substantially longitudinally and exteriorly of the engine, said intake portion having a primary fuel mixture conducting portion extending upwardly from the first said intake manifold portion for connection with an engine carburetor positioned substantially above the exhaust manifold, and means associated with said manifold portions to shield the primary conducting portion from the heat of exhaust gases in said exhaust manifold portion.

5. A manifold structure for an internal combustion engine and including an exhaust manifold portion and an intake manifold portion, said portions extending substantially longitudinally and exteriorly of the engine, said intake portion having a primary fuel mixture conducting portion extending upwardly from the first said intake manifold portion, said structure further including a conduit intermediate said exhaust manifold portion and said primary conducting portion and adapted for conducting a cooling medium to absorb heat from said exhaust manifold portion.

6. A manifold structure for an internal combustion engine having a cylinder and cylinder head structure water circulating system for said structures, said manifold structure including an exhaust manifold portion, an intake manifold portion, said manifold portions being located exteriorly of said engine and adjacent one side thereof, said intake manifold portion having a primary conducting portion extending upwardly from said intake manifold portion and a water conduit intermediate the exhaust and intake manifold portions and connected with the engine water circulating system, said conduit comprising a water conducting passage connecting the cylinder and cylinder head water circulating systems, said water conduit extending substantially transverse with respect to said manifold portions and intermediate said primary conducting portion and said exhaust manifold portion.

7. A manifold structure for an internal combustion engine having a water circulating system, said manifold structure including an exhaust manifold portion, an intake manifold portion, said manifold portions being located exteriorly of said engine and adjacent one side thereof, and a water conduit intermediate the exhaust and intake manifold portions and connected with the engine water circulating system, said intake manifold portion having a primary fuel mixture conducting portion extending upwardly from the first said manifold portion, said water conduit extending adjacent to and longitudinally of said primary fuel mixture conducting portion, whereby to shield said fuel mixture conducting portion from the heat radiated from the exhaust manifold portion.

8. In an internal combustion engine, an exhaust manifold, a fuel mixture intake manifold having a primary conducting portion extending upwardly from said manifold, said manifold being located exteriorly of the engine and adjacent one side thereof, a cylinder, a water jacket surrounding said cylinder, a cylinder head including a cylinder head water jacket, and a jacket portion associated with said exhaust manifold and disposed intermediate the intake manifold primary conducting portion and said exhaust manifold and connected with the cylinder and cylinder head water jackets.

9. In an internal combustion engine having a carburetor, an exhaust manifold, a fuel mixture intake manifold of the type having an upwardly extending primary conducting means operatively connected with the carburetor, said carburetor being positioned substantially above a portion of the exhaust manifold, and heat absorbing means including a cooling fluid conducting portion intermediate said exhaust manifold and the primary conducting means of said intake manifold for shielding the aforesaid carburetor from the heat of the exhaust manifold.

10. In an internal combustion engine, an exhaust manifold, a down draft carburetor, a fuel mixture intake means having a primary fuel mixture conducting portion lying substantially in proximity to the engine exhaust manifold and connected with the carburetor, and means including a conduit through which cooling fluid may be circulated and which is located intermediate the primary fuel mixture conducting portion and said exhaust manifold for shielding the carburetor from the heat of the exhaust manifold.

11. In an internal combustion engine, an exhaust manifold, a down draft carburetor, a fuel mixture intake manifold including a primary fuel mixture conducting portion connected with said carburetor, said exhaust manifold being located substantially in proximity to said primary conducting portion and below the carburetor, and heat absorbing means including a cooling fluid jacketed portion intermediate said primary conducting portion and said exhaust manifold for shielding the carburetor from the heat of the exhaust manifold.

HAROLD H. TIMIAN.